(12) United States Patent
Haceaturean et al.

(10) Patent No.: US 10,565,630 B2
(45) Date of Patent: Feb. 18, 2020

(54) METHOD AND SYSTEM FOR IDENTIFICATION OF SPECIALLY FORMATTED DATA SETS FOR OPTIMIZATION OF ACQUIRER PERFORMANCE

(71) Applicant: MasterCard International Incorporated, Purchase, NY (US)

(72) Inventors: Alexandr Haceaturean, Dublin (IE); Shavkat Isamukhamedov, Moscow (RU); Koen Bosmans, Ophain-Bois-Seigneur-Isaac (BE); Ali Boujtat, Waterloo (BE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 591 days.

(21) Appl. No.: 15/022,265

(22) PCT Filed: Feb. 3, 2016

(86) PCT No.: PCT/IB2016/000279
§ 371 (c)(1),
(2) Date: Mar. 16, 2016

(87) PCT Pub. No.: WO2017/134478
PCT Pub. Date: Aug. 10, 2017

(65) Prior Publication Data
US 2017/0337599 A1    Nov. 23, 2017

(51) Int. Cl.
*G06Q 20/00* (2012.01)
*G06Q 30/06* (2012.01)
(Continued)

(52) U.S. Cl.
CPC ............. *G06Q 30/06* (2013.01); *G06Q 20/02* (2013.01); *G06Q 40/02* (2013.01)

(58) Field of Classification Search
CPC .......................... G06Q 20/4016; G06F 17/30
(Continued)

(56) References Cited

U.S. PATENT DOCUMENTS

| 7,779,160 B1 | 8/2010 | Symonds et al. |
| 2005/0080728 A1* | 4/2005 | Sobek ............... G06Q 20/04 705/39 |

(Continued)

OTHER PUBLICATIONS

International Search Report and Written Opinion issued by the International Search Authority dated Oct. 20, 2016 in PCT Application No. PCT/IB 2016/000279 (7 pages).

*Primary Examiner* — Rokib Masud
(74) *Attorney, Agent, or Firm* — Buchanan Ingersoll & Rooey PC (57) ABSTRACT

A method for identifying attributes for transaction messages exhibiting technical decline factors includes: storing transaction messages, each being formatted based on one or more standards and including a plurality of data elements including a first data element configured to store a response code; storing a plurality of attribute correspondences, each including a correspondence between a transaction attribute and data element value for a specific data element; executing a first query to identify a subset of transaction messages where the response code is one of a predetermined set of values; executing a second query to associate, for each transaction message, one or more transaction attributes based on data element values in the message and the attribute correspondences; identifying one or more transaction groups, each group corresponding to at least one transaction attribute and including transaction messages of the subset associated with each corresponding transaction attribute.

18 Claims, 6 Drawing Sheets

(51) Int. Cl.
  *G06Q 20/02* (2012.01)
  *G06Q 40/02* (2012.01)
(58) Field of Classification Search
  USPC .................................... 705/16, 17; 707/769
  See application file for complete search history.

(56) References Cited

U.S. PATENT DOCUMENTS

| | | |
|---|---|---|
| 2008/0033880 A1 | 2/2008 | Fiebiger et al. |
| 2011/0006113 A1 | 1/2011 | Uchikura |
| 2013/0066900 A1* | 3/2013 | Narasimhan .......... G06F 16/215 707/769 |
| 2016/0063500 A1* | 3/2016 | Sherlock ............ G06Q 20/4016 705/44 |

* cited by examiner

METHOD AND SYSTEM FOR IDENTIFICATION OF SPECIALLY FORMATTED DATA SETS FOR OPTIMIZATION OF ACQUIRER PERFORMANCE

FIELD

The present disclosure relates to identification of specially formatted data sets for the optimization of acquirer performance, specifically the identification of transaction messages exhibiting technical decline factors for use in the optimization of acquirer processing of electronic transactions.

BACKGROUND

Payment transactions often involve multiple entities, each of whom have their own criteria for approving or declining a transaction. At the highest level, each entity involved is interested in ensuring that the payer of a transaction has sufficient funds to cover the costs of the transaction. Many entities are also interested in ensuring that a payer or payee is genuine and not fraudulent, such as to provide confidence that the promised funds will be paid for a transaction or that the transacted-for goods or services will be provided. In order to obtain such assurances, many entities, and in particular financial institutions acting on behalf of a payer or payee for a transaction, often utilize a number of services for authenticating entities involved in a payment transaction, as well as the data included in transaction messages themselves.

The use of such services, such as fraud detection services, consumer authentication services, etc., can result in a higher likelihood of detection of fraud and increase the overall chances that an approved transaction will be successfully funded. However, in some cases such systems may result in transactions being declined for technical reasons, even in instances where both the payer and the payee are genuine and interested in successful completion of the transaction. For instance, an acquiring financial institution acting on behalf of a merchant may use a fraud detection model that declines any cross-border transactions involving a consumer from a particular country, even if the consumer is one with whom the acquiring financial institution would normally be comfortable to transact. The declining of such a transaction for technical reasons would thus result in a loss of revenue to the merchant and acquiring institution, as well as a potential loss of the consumer as a recurring customer.

Thus, financial institutions may be interested in identification of instances where a transaction that may be otherwise approved is declined for technical reasons. However, financial institutions lack technical systems that are capable of identifying such instances, because these transactions are being declined by the institutions. In some cases, the technical declines may be occurring at the payment network, with the financial institution never receiving the transaction details for the transaction at all, further prohibiting the institution from identifying such instances. Thus, there is a need for a technical solution whereby a specially configured processing server can identify specially formatted data sets of transaction messages to identify instances of technical declines that may be used for the optimization of performance for acquiring financial institutions.

SUMMARY

The present disclosure provides a description of systems and methods for identifying attributes for transaction messages exhibiting technical decline factors.

A method for identifying attributes for transaction messages exhibiting technical decline factors includes: storing, in a first database of a processing server, a plurality of transaction messages, wherein each transaction message is formatted based on one or more standards and includes a plurality of data elements including at least a first data element configured to store a response code; storing, in a second database of the processing server, a plurality of attribute correspondences, wherein each attribute correspondence includes a correspondence between a transaction attribute and a data element value for a specific data element of the plurality of data elements; executing, by a processor of the processing server, a first query on the first database to identify a subset of transaction messages where the response code stored in the first data element is one of a predetermined set of response code values; executing, by the processor of the processing server, a second query on the identified subset of transaction messages to associate, for each transaction message, one or more transaction attributes based on data element values for the plurality of data elements included in the respective transaction message and the plurality of attribute correspondences stored in the second database; identifying, by the processor of the processing server, one or more transaction groups, wherein each transaction group corresponds to at least one transaction attribute and includes one or more transaction messages of the identified subset of transaction messages associated with each corresponding transaction attribute; and transmitting, by a transmitting device of the processing server, the identified one or more transaction groups.

A system for identifying attributes for transaction messages exhibiting technical decline factors includes: a first database of a processing server configured to store a plurality of transaction messages, wherein each transaction message is formatted based on one or more standards and includes a plurality of data elements including at least a first data element configured to store a response code; a second database of the processing server configured to store a plurality of attribute correspondences, wherein each attribute correspondence includes a correspondence between a transaction attribute and a data element value for a specific data element of the plurality of data elements; a processor of the processing server configured to execute a first query on the first database to identify a subset of transaction messages where the response code stored in the first data element is one of a predetermined set of response code values, execute a second query on the identified subset of transaction messages to associate, for each transaction message, one or more transaction attributes based on data element values for the plurality of data elements included in the respective transaction message and the plurality of attribute correspondences stored in the second database, and identify one or more transaction groups, wherein each transaction group corresponds to at least one transaction attribute and includes one or more transaction messages of the identified subset of transaction messages associated with each corresponding transaction attribute; and a transmitting device of the processing server configured to transmit the identified one or more transaction groups.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require and special knowledge in offered products. In some embodiments, an entity involved in a single transaction may be considered a merchant.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Acquirer—An entity that may process payment card transactions on behalf of a merchant. The acquirer may be a bank or other financial institution authorized to process payment card transactions on a merchant's behalf. In many instances, the acquirer may open a line of credit with the merchant acting as a beneficiary. The acquirer may exchange funds with an issuer in instances where a consumer, which may be a beneficiary to a line of credit offered by the issuer, transacts via a payment card with a merchant that is represented by the acquirer.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

System for Identification of Transaction Messages for Acquirer Optimization

Figure 1:
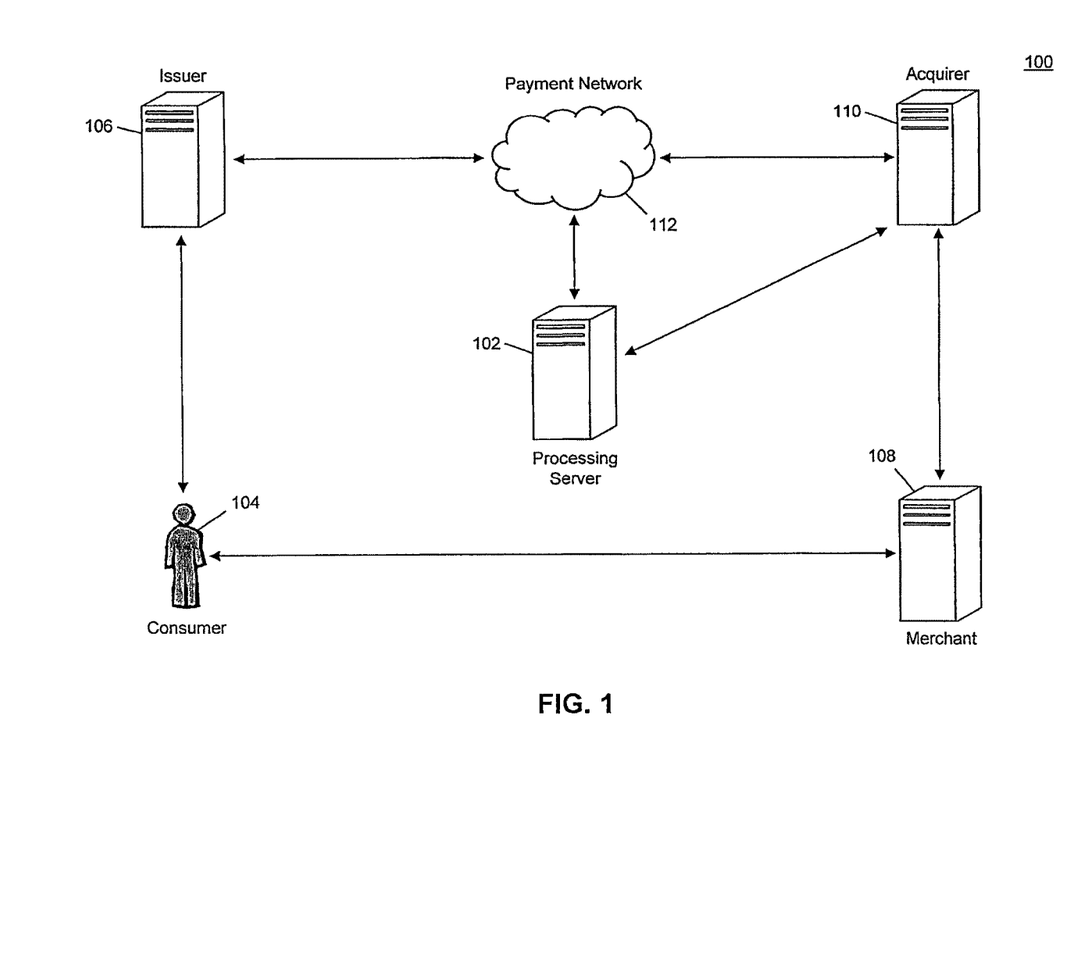
FIG. 1 is a block diagram illustrating a high level system architecture for the identification of attributes for transaction messages exhibiting technical decline factors in accordance with exemplary embodiments.

FIG. 1 illustrates a system 100 for the identification of attributes for specialized data sets of transaction messages exhibiting technical decline factors for the use of optimizing acquirer performance in electronic transactions.

The system 100 may include a processing server 102. The processing server 102, discussed in more detail below, may be a specially configured computing system that is specially configured to perform the functions discussed herein for the identification of transaction messages exhibiting technical decline factors and the categorization thereof using attributes, which may be used in the optimization of performance for financial institutions in electronic transactions, such as payment transactions.

In the system 100, a consumer 104 may participate in a payment transaction. The consumer 104 may have a transaction account held by an issuer 106. The issuer 106 may be a financial institution, such as an issuing bank, that is configured to hold transaction accounts for use by consumers in funding payment transactions. The consumer 104 may use a payment instrument associated with their transaction account in order to fund a payment transaction with a merchant 108. The payment instrument may be, for instance, a payment card, check, etc. The consumer 104 may furnish the payment instrument to the merchant 108, who may read payment details for the transaction account from the payment instrument using traditional methods and systems. The merchant 108 may provide the payment details, as well as additional transaction details, to an acquirer 110.

The acquirer 110 may be a financial institution, such as an acquiring bank, that is configured to hold transaction accounts for use by merchants participating in payment transactions. In some embodiments, the issuer 106 and acquirer 110 may be the same financial institution. The acquirer 110 may receive the transaction details and payment details from the merchant 108 and may generate a transaction message for the payment transaction. A transaction message may be a specially formatted data set that is formatted based on one or more standards, such as the International Organization for Standardization's ISO 8583 standard. The transaction message may include a plurality of data elements, each configured to store data as set forth in the associated standards.

The transaction message may include, for example, a data element configured to store a primary account number, which may include an account number associated with the transaction account being used by the consumer 104 to fund the transaction. The transaction message may include an additional data element configured to store a transaction amount for the payment transaction. Additional data elements included in the transaction message may store data associated with the merchant 108 (e.g., account numbers, point of sale identifiers, geographic information, category codes, etc.), the acquirer 110 (e.g., account numbers, routing numbers, geographic information, etc.), the issuer 106 (e.g., account numbers, routing numbers, geographic information, etc.), and the transaction itself (e.g., product data, reward data, loyalty data, offer data, times, dates, geographic information, etc.).

The transaction message may also include data elements configured to store data for use in the processing of the transaction. For example, the transaction message may include data elements configured to store a settlement amount, a settlement date, a transaction fee, an audit number, etc. The transaction message may also include a data element configured to store a response code, as discussed in more detail below. The transaction message may also include or be otherwise associated with a message type indicator. The message type indicator may be used to indicate what type of message the transaction message represents, for use by the financial institutions and other entities in processing and routing transaction messages. For instance, the acquirer 110 may generate the transaction message for the payment transaction with a message type indicator indicative of the message being an authorization request.

The acquirer 110 may then submit the generated transaction message to a payment network 112 for processing. The transaction message may be submitted using the payment rails, which is a specially configured electronic infrastructure configured to transmit and receive specially formatted transaction messages. Transaction messages may be formatted such that traditional communication networks (e.g., local area networks, the Internet, etc.) may be unable to transmit or received transaction messages. Payment networks 112 may communicate with financial institutions (e.g., issuers 106 and acquirers 110) using the payment rails, which may facilitate the secure transmission of the transaction messages.

The payment network 112 may receive the transaction message from the acquirer 110, parse the data contained in the data elements therein, and process the message accordingly using traditional methods and systems. For instance, if the transaction message is an authorization request, the payment network 112 may identify the issuer 106 involved in the payment transaction (e.g., as the issuer of the transaction account being used to fund the transaction) based on the data stored in the data elements of the transaction message and route the transaction message to the issuer 106 using the payment rails. In some instances, the payment network 112 may perform additional actions prior to routing the message, such as the calculation of fraud scores, the modification of data values stored in data elements (e.g., for routing purposes, mapping of account numbers, application of coupons or offers, etc.).

The issuer 106 may receive the transaction message and may determine to approve or deny the payment transaction using traditional methods. For instance, the issuer 106 may determine if the transaction account used by the consumer 104 (e.g., as indicated in the corresponding data elements in the transaction message) has sufficient funds to cover the transaction amount as indicated in the corresponding data element, and may also determine a willingness to accept a likelihood of fraud as may be indicated by a fraud score provided by the payment network 112 or a third party service. The issuer 106 may determine to approve or deny the transaction and may indicate thusly by modifying a data element included in the transaction message configured to store a response code.

The response code may be a value indicative of a response being provided by the issuer 106 regarding the transaction message. The response code may indicate, for example, that the transaction is approved, that the transaction is approved for a partial amount (e.g., with the amount indicated in a separate data element), or that the transaction is declined. For a declined transaction, the response code may be indicative of a reason for the declining of the transaction. Reasons for a decline may include, for instance, an invalid account number, a lost payment card, a stolen payment card, insufficient funds, an expired payment card, invalid authentication data (e.g., a personal identification number), invalid merchant, data formatting error, cryptographic failure, likelihood of fraud, duplicate transmission, system error, invalid transaction data, etc.

The issuer 106 may transmit the modified transaction message back to the payment network 112 using the payment rails. In some instances, the message type indicator may be modified to be indicative of an authorization response. The payment network 112 may receive the modified transaction message and perform any necessary actions that will be apparent to persons having skill in the relevant art, such as the remapping of an account number, modification to a transaction amount, etc. The payment network 112 may then forward the transaction message to the acquirer 110. The acquirer 110 may notify the merchant 108 of the results of the transaction processing based on the response code (e.g., if the transaction was approved or denied), and the merchant 108 may finalize the transaction accordingly, such as by notifying the consumer 104 of the results of the processing and providing goods or services to the consumer 104.

In the system 100, the processing server 102 may be configured to identify groups of transaction messages for which there are technical declines and group transaction messages based on common attributes for use in optimizing performance by acquirers 110. The processing server 102 may include a transaction database, discussed in more detail below, configured to store transaction messages for payment transactions involving a plurality of merchants 108. In some embodiments, the processing server 102 may receive the transaction messages from the payment network 112, such as using the payment rails. In other embodiments, the processing server 102 may be part of the payment network 112 and may receive the transaction messages via internal communication methods. In some cases, the processing server 102 may be configured to process payment transactions for the payment network 112 and may obtain transaction messages for storage via the processing of transactions (e.g., by receiving transaction messages from acquirers 110 and issuers 106).

The processing server 102 may receive a request for transaction groups. The request may be superimposed on a data signal electronically transmitted by a third party, such as an acquirer 110, or input via one or more input devices, such as by a user working at a terminal of the processing server 102. The request may include at least an acquirer identification code, which may be a unique value associated with an acquirer (e.g., the acquirer 110) for which transaction groups are requested.

The processing server 102 may parse the received electronic signal to obtain the request included therein and the included acquirer identification code. The processing server 102 may then execute a query on the transaction database to identify a group of transaction messages where the data element configured to store an acquirer identification code includes the acquirer identification code from the request and where the data element configured to store a response code includes a response code value indicative of a technical decline.

A technical decline may be a decline of the corresponding payment transaction that is due to a technical failure as depicted by the issuer 106 involved in the transaction, such as a transaction where there is a potential data quality compromise depicted in the data elements contained in the corresponding transaction message. A technical decline may be in contrast to a discretionary decline, which may be a decline that is performed at the discretion of the issuer 106 involved in the transaction for a proprietary reason. Discretionary declines may include, for instance, an invalid payment card number, insufficient funds, an exceeded transaction control, an exceeded number of personal identification number tries, etc. Technical declines may include, for instance, an invalid merchant, an invalid transaction amount, an invalid issuer, a formatting error, an missing data element, an unacceptable personal identification number, a cryptographic failure, an inoperable authorization system, a routing failure, a system error, etc.

The identified group of transaction messages may include data elements configured to store response codes that include a response code whose value corresponds to one of a predetermined set of response code values that are associated with technical declines. In some instances, the predetermined set of response code values may be based on response code values set forth in the associated standard, such as the ISO 8583 or other standard applicable to transaction messages. In some embodiments, the transaction messages identified may also be transaction messages whose message type indicator is indicative as an authorization request and/or an authorization response.

Once the group of transaction messages has been identified, the processing server 102 may assign attributes to each of the transaction messages included therein. Attributes may be assigned to transaction messages based on the data values included in data elements contained therein. The processing server 102 may store attribute relationships as a specialized data set in a relationship database, discussed in more detail below. The attribute relationships may be a relationship between a data value of a specific data element (e.g., based on associated standards) and an associated attribute.

For example, one attribute relationship may be based on geography of a transaction where the transaction is identified with the attribute of "cross border" if a data element configured to store a country name for the transaction has a different value than a data element configured to store a country name for the issuer 106 involved in the transaction. If the data values are the same, the transaction may be identified as having the attribute of "domestic." In another example, if a data element configured to store a merchant category code has a data value of 7995, the transaction may be identified as having the attribute of a "gambling transaction." In yet another example, if a data element configured to store an indication of a present payment card has a value of 1, then the transaction may be identified as a "card not present" transaction and have a corresponding attribute.

The processing server 102 may execute a query on the relationship database to identify attribute relationships where the data values included therein correspond to data values for the corresponding data elements in a given transaction message. The processing server 102 may then assign the respective attributes to the transaction message. In some instances, a transaction message may have a single attribute. In other instances, a transaction message may have a plurality of different attributes, each based on a data value of a separate data element contained therein.

Once attributes have been assigned to the transaction messages in the group, the processing server 102 may further group the transaction messages into subgroups based on their attributes. In some instances, a transaction message may be included in multiple subgroups, such as a different subgroup for each associated attribute. In other instances, a transaction message may be included in a single subgroup, which may be based on a priority of attributes. The priority may be based on rules set forth by the processing server 102, or in the request (e.g., submitted by the acquirer 110). For example, the acquirer 110 may be more interested in transaction messages for cross border transactions than transaction messages for petrol purchases. In some instances, a transaction message may be included in the largest possible subgroup for an associated attribute. In some embodiments, subgroups may have multiple associated attributes, such as for grouping transaction messages each having one of a plurality of attributes assigned thereto. For example, transaction messages that are (i) cross-border (ii) petrol purchases for (iii) a specific issuer.

Once the subgroups are identified, the processing server 102 may transmit the subgroups in response to the received request. The transmitted subgroups may be superimposed on an electronic data signal that is transmitted in response to the request using an appropriate method, such as a communication network for transmission to the acquirer 110, to a display device for display to a user of a terminal of the processing server 102, etc. The transaction message groups may then be used to optimize performance of the acquirer 110.

For example, the processing server 102 may identify a subgroup of transactions having two sets of attributes corresponding to a cryptographic failure due to a missing data value for a specific data element and the transaction involving a specific issuer 106. In such an example, the issuer 106 may require a specific type of data value to be included in a data element, such as corresponding to a type of cryptographic analysis to be performed for the transaction that the acquirer 110 does not currently perform. By identifying these attributes, the technical declines for the transactions may be readily understood. The acquirer 110 can then perform the cryptographic analysis and, as a result, have more transactions successfully approved rather than declined, and thereby increase revenue for both the acquirer 110 and issuer 106.

Accordingly, the methods and systems discussed herein provide for the grouping and categorization of standardized transaction messages for which there are technical declines as evidenced by included data values, which may be used for the optimization of acquirer performance in electronic payment transactions. By identifying transaction messages corresponding to payment transactions for which there are technical declines, and by grouping them based on attributes, the processing server 102 may efficiently identify transactions that are declined for technical reasons that may be remedied by the acquirer 110, which are grouped to facilitate quicker analysis and a higher efficiency in terms of identifying problems and maximizing of solutions.

Processing Server

Figure 2:
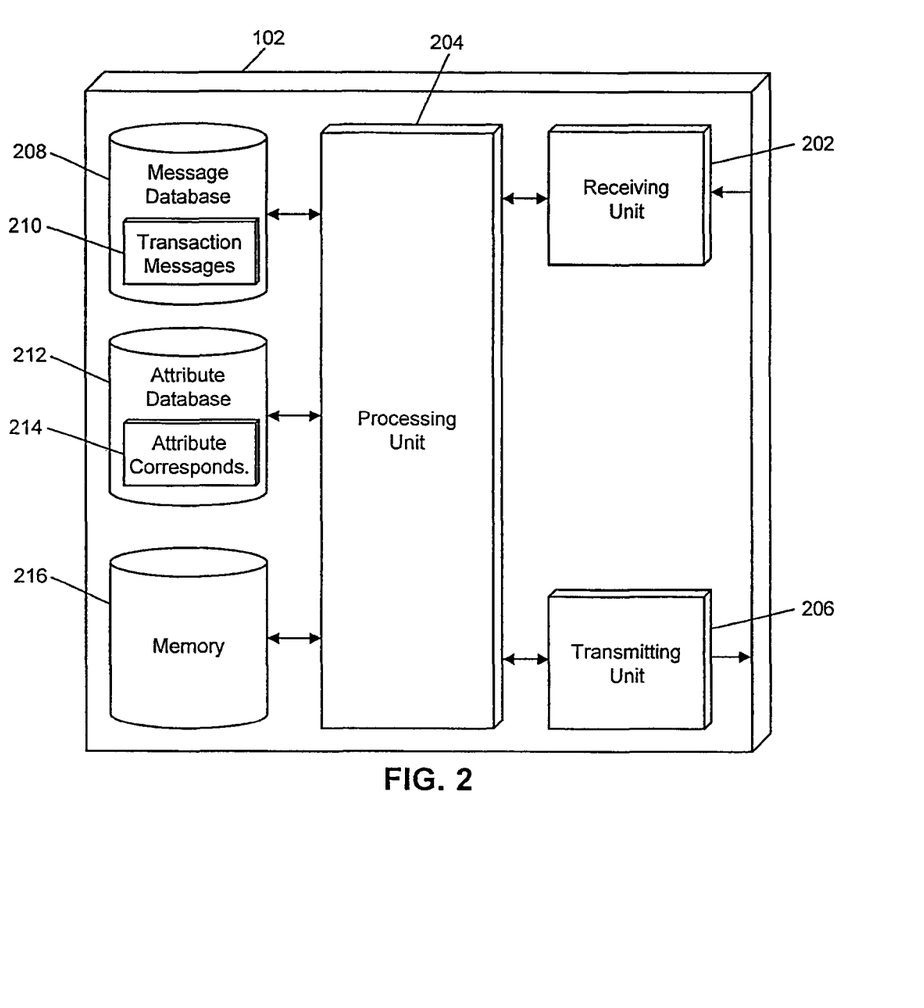
FIG. 2 is a block diagram illustrating the processing server of FIG. 1 for the identification of attributes for transaction messages exhibiting technical decline factors in accordance with exemplary embodiments.

FIG. 2 illustrates an embodiment of the processing server 102 of the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 600 illustrated in FIG. 6 and discussed in more detail below may be a suitable configuration of the processing server 102.

The processing server 102 may include a receiving unit 202. The receiving unit 202 may be configured to receive data over one or more networks via one or more network protocols. In some embodiments, the receiving unit 202 may be configured to receive data over the payment rails, such as using specially configured infrastructure associated with payment networks 112 for the transmission of transaction messages that include sensitive financial data and information. In some instances, the receiving unit 202 may also be configured to receive data form acquirers 110 and other entities via alternative networks, such as the Internet. In some embodiments, the receiving unit 202 may be comprised of multiple units, such as different receiving units for receiving data over different networks, such as a first receiving unit for receiving data over payment rails and a second receiving unit for receiving data over the Internet. The receiving unit 202 may receive electronically data signals that are transmitted, where data may be superimposed on the data signal and decoded, parsed, read, or otherwise obtained via receipt of the data signal by the receiving unit 202. In some instances, the receiving unit 202 may include a parsing module for parsing the received data signal to obtain the data superimposed thereon.

The receiving unit 202 may receive, for instance, transaction messages from the acquirer 110, issuer 106, or payment network 112. The transaction messages may be transmitted using the payment rails and may be received and parsed by the receiving unit 202 to identify the data elements included in the transaction message and the data values stored therein. The receiving unit 202 may also be configured to receive transaction requests from the acquirer 110, one or more input devices, or other data source. The transaction requests may be superimposed in electronically transmitted data signals and may be requests for transaction groups identified using the methods discussed herein.

The processing server 102 may also include a processing unit 204. The processing unit 204 may be configured to perform the functions of the processing server 102 discussed herein as will be apparent to persons having skill in the relevant art. In some embodiments, the processing unit 204 may include and/or be comprised of a plurality of engines and/or modules specially configured to perform one or more functions of the processing unit 204. For example, the processing unit 204 may include a querying module configured to query databases included in the processing server 102 to identify information stored therein. In some instances, the processing unit 204 may include a parsing module or engine configured to parse data from data signals electronically received by the receiving unit 202.

The processing server 102 may also include a message database 208. The message database 208 may be configured to store a plurality of transaction messages 210 using an appropriate data storage format and schema. The transaction messages 210 stored therein may be formatted pursuant to one or more standards for transaction messages, such as the IDO 8583 standard. Each transaction message 210 may be related to a payment transaction and may be a standard data set that includes data as defined by the associated standards, including a plurality of data elements, each data element being configured to store a data value as set forth in the associated standard. The plurality of data elements may include at least a first data element configured to store an acquirer identification code associated with an acquirer 110 involved in the related payment transaction and a second data element configured to store a response code.

The processing server 102 may also include an attribute database 212. The attribute database 212 may be configured to store a plurality of attribute correspondences 214 using an appropriate data storage format and schema. Each attribute correspondence 214 may include a correspondence between a transaction attribute and a data value for a specific data element of the plurality of data elements set forth in the one or more standards for which the transaction messages 210 are formatted.

The processing unit 204 may be configured to execute queries on the message database 208 and attribute database 212 to identify data stored therein. For instance, the processing unit 204 may be configured to identify a group of transaction messages 210 where the data value included in the data element configured to store an acquirer identification code corresponds to a particular acquirer identification code (e.g., as indicated in a request received by the receiving unit 202 and parsed by a parsing module) and where the data value included in the data element configured to store the response code corresponds to one of a predetermined set of response code values, such as response code values associated with a technical decline. In some instances, the set of response code values may be specific to the acquirer 110 associated with the acquirer identification code used in the query of the message database 208.

The processing unit 204 may also be configured to identify transaction attributes for transaction messages. In such instances, the processing unit 204 may query the attribute database 212 to identify attribute correspondences 214 where the included data value for a specific data element corresponds to the data value stored in the same specific data element included in a given transaction message. In some cases, the query of the attribute database 212 may identify a plurality of attribute correspondences 214 for a single transaction message. The processing unit 204 may be configured to associate the transaction attributes included in the identified attribute correspondences 214 to the transaction message. In some instances, the transaction attributes may be stored in the message database 208 as being associated with the transaction message 210.

The processing unit 204 may also be configured to group transaction messages. The processing unit 204 may group transaction messages based on the associated transaction attributes. In some instances, a transaction message may be included in multiple groups, such as one for each associated transaction attribute and/or for each possible combination of transaction attributes. In other instances, a transaction message may be included in a single group. The grouping of transaction messages may be specified in a request received by the receiving unit 202. For instance, the request may specify if a transaction message may be included in one or multiple groups, may specify the transaction attributes of groups, may specify the minimum number of transaction messages having a specific attribute there must be to establish a group, etc. In some embodiments, the processing unit 204 may group transaction messages based on attributes such that the number of transaction messages in a group is maximized based on the distribution of transaction attributes.

The processing server 102 may further include a transmitting unit 206. The transmitting unit 206 may be configured to transmit data over one or more networks via one or more network protocols. In some embodiments, the transmitting unit 206 may be configured to transmit data over the payment rails, such as using specially configured infrastructure associated with payment networks 112 for the transmission of transaction messages that include sensitive financial data and information. In some instances, the transmitting unit 206 may be configured to transmit data to acquirers 110 and other entities via alternative networks, such as the Internet. In some embodiments, the transmitting unit 206 may be comprised of multiple units, such as different transmitting units for transmitting data over different networks, such as a first transmitting unit for transmitting data over the payment rails and a second transmitting unit for transmitting data over the Internet. The transmitting unit 206 may electronically transmit data signals that have data superimposed that may be parsed by a receiving computing device. In some instances, the transmitting unit 206 may include one or more modules for superimposing, encoding, or otherwise formatting data into data signals suitable for transmission.

The transmitting unit 206 may be configured to electronically transmit a data signal comprising the identified transaction groups, such as to acquirers 110 or to a display device configured to display data to a user of the processing server 102. In some instances, the identified transaction groups may be transmitted in response to the received request. In some embodiments, the transmitting unit 206 may be configured to transmit data indicative of the identified transaction groups, such as may be identified by the processing unit 204 or a module or engine contained therein, such as an analytic engine. For instance, the analytic engine may identify the number of transactions in each transaction group, and the transmitting unit 206 may transmit a data signal superimposed with data of the transaction attributes for each transaction group and the number of transactions included therein. In such an instance, the transmitting unit 206 may not externally transmit any data stored in the data elements included in the transaction messages themselves.

The processing server 102 may also include a memory 216. The memory 216 may be configured to store data for use by the processing server 102 in performing the functions discussed herein. The memory 216 may be configured to store data using suitable data formatting methods and schema and may be any suitable type of memory, such as read-only memory, random access memory, etc. The memory 216 may include, for example, sets of response code values, transaction attribute associations for transaction messages, grouping rules and/or algorithms, communication protocol data, standards data, and other data that may be suitable for use by the processing server 102 in the performance of the functions disclosed herein as will be apparent to persons having skill in the relevant art.

Process for Grouping Transaction Messages Exhibiting Technical Decline Factors

Figure 3:
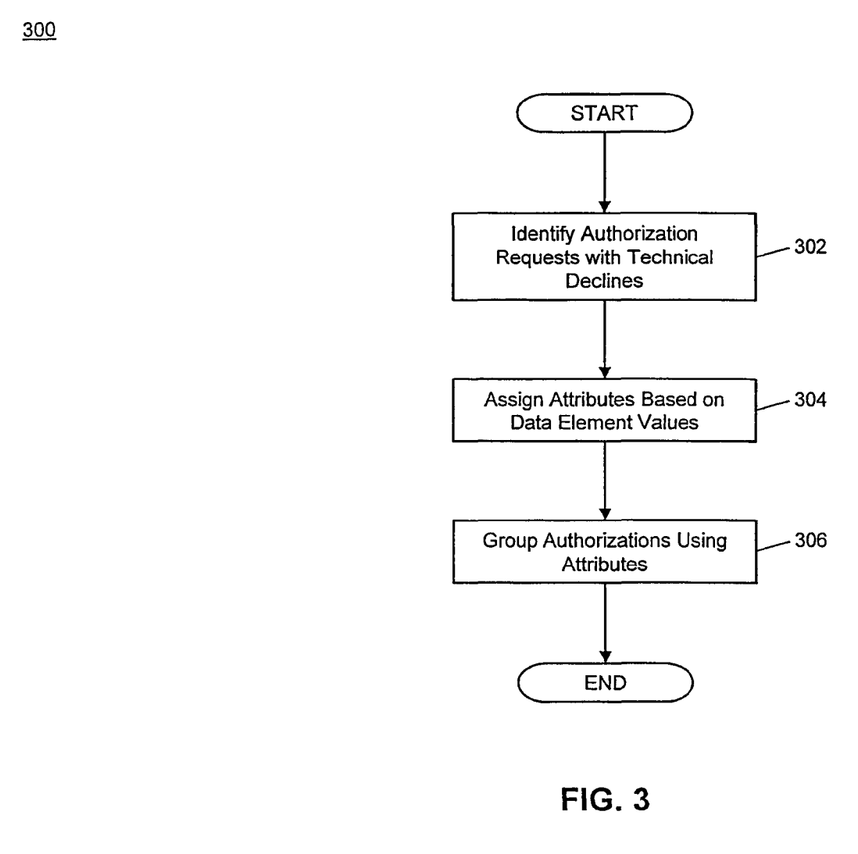
FIG. 3 is a flow diagram illustrating a process for identifying groups of transaction messages having technical declines using common attributes in accordance with exemplary embodiments.

FIG. 3 illustrates a process 300 for the grouping and categorization of transaction messages having technical decline factors based on transaction attributes using the processing server 102 of the system 100.

In step 302, the processing unit 204 of the processing server 102 may identify transaction messages that are authorization requests that exhibit technical decline factors. The identification of such transaction messages may include the querying (e.g., by a querying module) of the message database 208 to identify transaction messages 210 that have message type indicators indicative of being an authorization request and where the data value included in the data element configured to store a response code corresponding to one of a set of response code values that are associated with technical declines. In some instances, an acquirer identification code may be supplied, such as in a request submitted by an associated acquirer 110 or input to the processing server 102 by a user, which may be used in the identification of the authorization requests where the acquirer identification code stored in a corresponding data element in each transaction message 210 corresponds to the supplied acquirer identification code.

In step 304, transaction attributes may be assigned to each of the identified transaction messages 210 based on data values of the data elements included therein. The transaction attributes may be assigned to each transaction message 210 by the identification of one or more attribute correspondences 214 stored in the attribute database 212 (e.g., via the querying of the attribute database 212 by a querying module) where the included data value for a specific data element corresponds to the data value stored in that same data element in the respective transaction message 210. The transaction attributes included in each of the identified attribute correspondences 214 may then be assigned to the respective transaction message 210. In some instances, the attributes may be stored in the message database 208 or in the memory 216 as being assigned to the respective transaction message 210.

In step 306, the transaction messages 210 may be grouped by the processing unit 204 (e.g., by a specially configured grouping module or engine) based on the assigned transaction attributes. In some instances, a group may be established for each transaction attribute, with every transaction message 210 having that transaction attribute being included in the respective group. In other instances, a transaction message 210 may only be grouped into a single group of transaction messages. In such an instance, a transaction message 210 may be grouped into a group having the highest number of matching transaction attributes, based on a priority of transaction attributes for grouping, or other suitable method.

Categorization of Transaction Messages Based on Transaction Attributes

Figure 4:
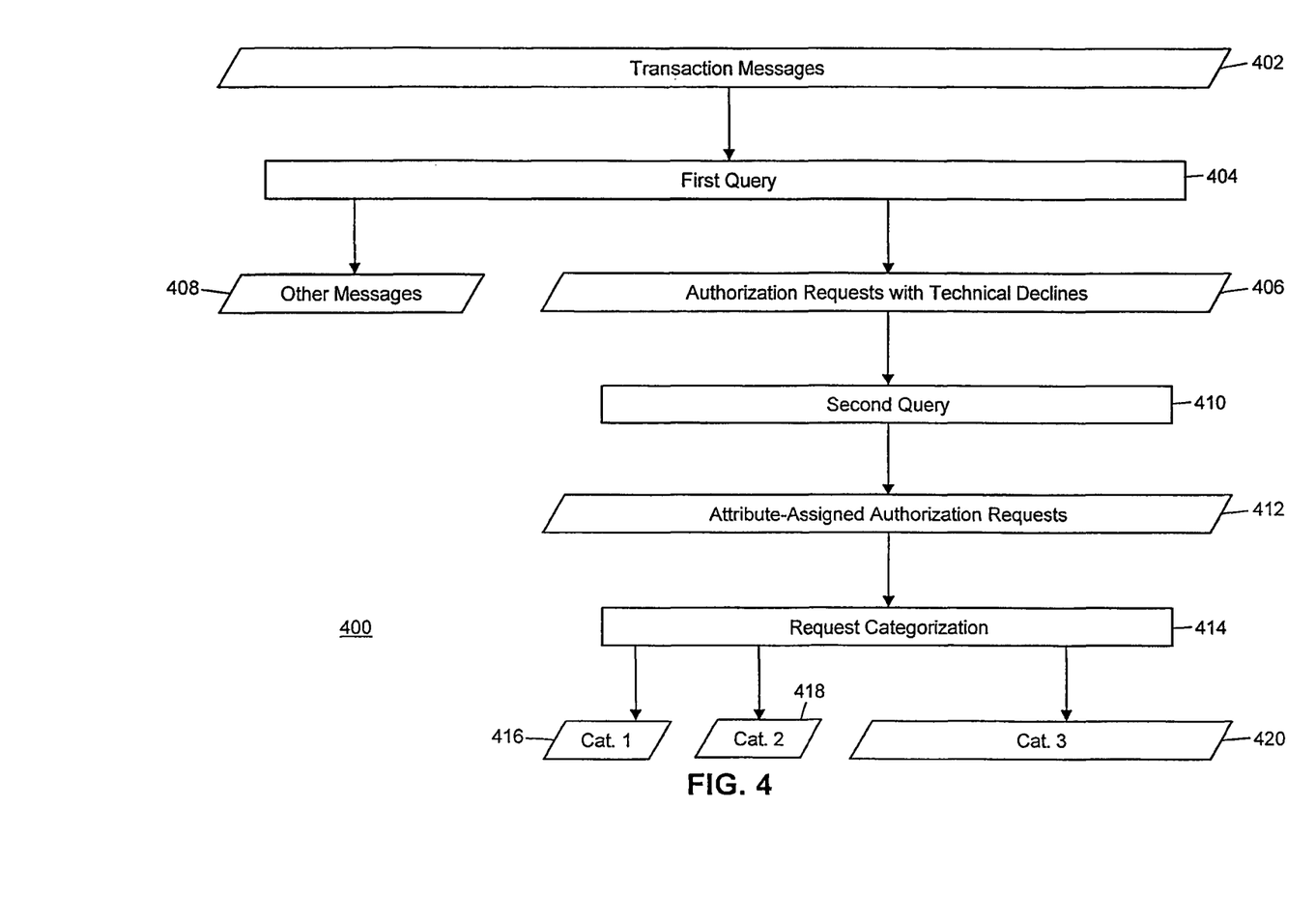
FIG. 4 is a flow diagram illustrating a process for the categorization of transaction messages having technical declines based on attributes in accordance with exemplary embodiments.

FIG. 4 illustrates the identification of transaction messages exhibiting technical decline factors and the categorization thereof based on transaction attributes that are assigned to the messages based on data element values included therein.

A set of transaction messages 402, such as corresponding to each transaction message 210 stored as a structured data set in the message database 208, may be set for categorization, with each transaction message in the set of transaction messages 402 being formatted based on one or more standards and including a plurality of data elements, each configured to store data as set forth in the one or more standards including a data element configured to store a response code. In some embodiments, each transaction message in the set of transaction messages 402 may include a data element configured to store an acquirer identification code, with the data value stored therein being a common acquirer identification code, such as one associated with a specific acquirer 110 for which the transaction messages are being categorized.

A first query 404 may be executed by a querying module of the processing unit 204 of the processing server 102, which, when executed on the set of transaction messages 402, may identify transaction messages where the data value stored in the data element configured to store a response code corresponds to one or a predetermined set of response code values, such as response code values associated with a technical decline, and where the message type indicator for the transaction message is indicative of an authorization request. The results of the execution of the first query may be the identification of the authorization requests with technical declines, illustrated in FIG. 4 as the authorization requests 406, which may be separate from other transaction messages 408 included in the set of transaction messages 402.

Once the authorization requests with technical declines 406 have been identified, a second query 410 may be executed on the transaction messages by the querying module of the processing unit 204 of the processing server 102. The second query 410 may identify, for each transaction message of the authorization requests with technical declines 406, one or more attribute correspondences 214 in the attribute database 212 where the included data value corresponds to the data value stored in a specified data element of the transaction message. As part of the execution of the second query 410, another module of the processing unit 204 may assign the transaction attribute in the identified attribute correspondence(s) 214 to the respective transaction message. The result may be a set of attribute-assigned authorization requests 412, where each authorization request is associated with a specific acquirer 110, exhibits technical decline factors, and has been assigned one or more transaction attributes based on the data values stored in data elements included therein.

The attribute-assigned authorization requests 412 may then be categorized via a request categorization process 414, which may be applied to the attribute-assigned authorization requests 412 by a grouping module of the processing unit 204 of the processing server 102. In the example illustrated in FIG. 4, the attribute-assigned authorization requests 412 may be grouped into three separate categories, illustrated in FIG. 4 as categories 416, 418, and 420. Each of the categories may be associated with one or more transaction attributes such that no category is associated with a common set of transaction attributes, and may include the transaction messages from the attribute-assigned authorization requests 412 where the assigned attributes correspond to those associated with the respective category.

As illustrated in FIG. 4, each of the categories may include a different number of transaction messages. For instance, in the illustrated example, the third category 420 may include more transaction messages than in the categories 416 and 418. In such an instance, the transaction messages in the third category 420 may be analyzed for use in the optimization of performance by the acquirer 110, such as by identifying the response code for the technical decline for each of the transaction messages in the third category 420 and their transaction attributes to identify how the acquirer 110 may prevent future technical declines of that type.

Figure 5:
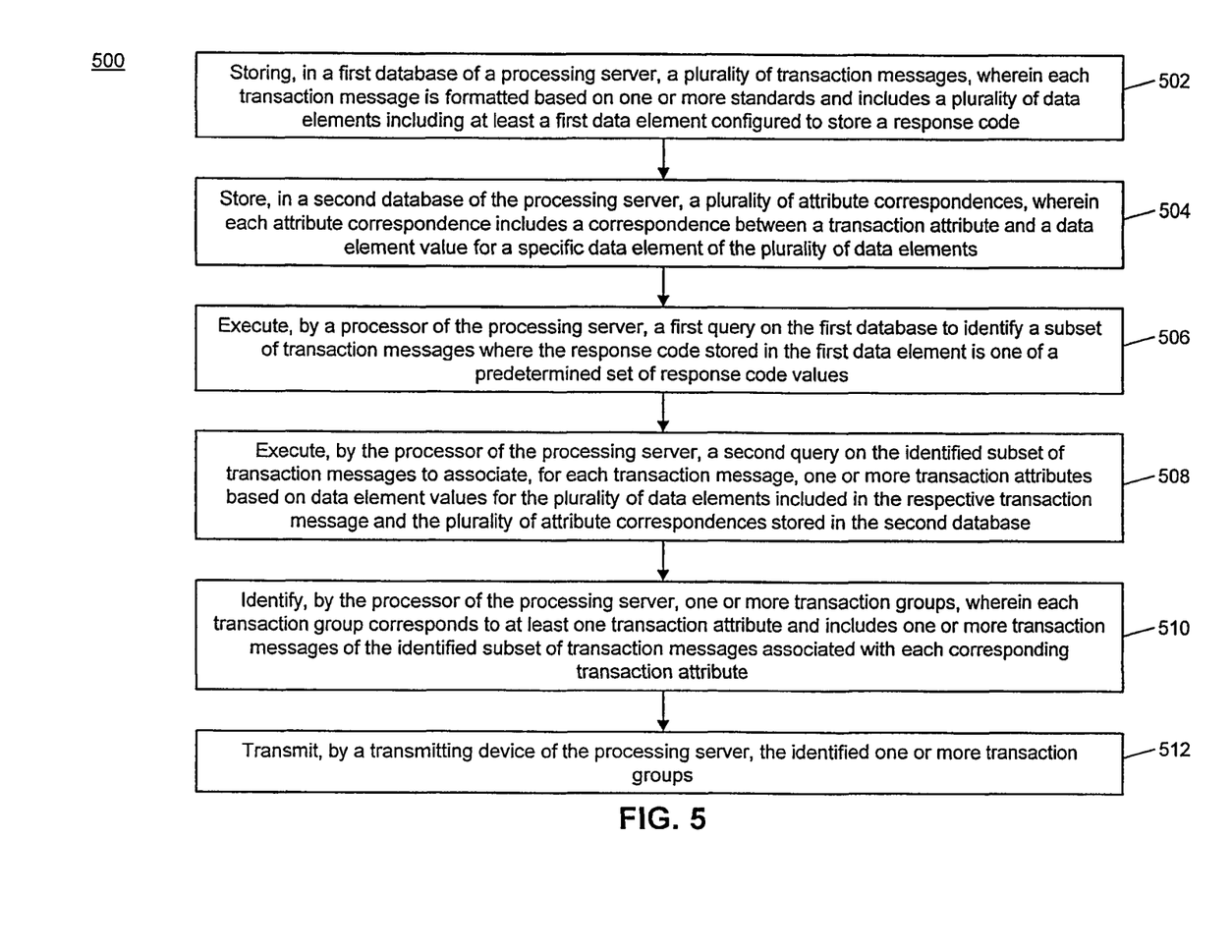
FIG. 5 is a flow chart illustrating an exemplary method for identifying attributes for transaction messages exhibiting technical decline factors in accordance with exemplary embodiments.

Exemplary Method for Identifying Attributes for Transaction Messages Exhibiting Technical Decline Factors FIG. 5 illustrates a method 500 for the assignment of attributes to specially formatted transaction messages based on data values included therein for transaction messages that exhibit technical decline factors, for use in categorizing transaction messages for optimization of acquirer performance.

In step 502, a plurality of transaction messages (e.g., transaction messages 210) may be stored in a first database (e.g., the message database 208) of a processing server (e.g., the processing server 102), wherein each transaction message is formatted based on one or more standards and includes a plurality of data elements including at least a first data element configured to store a response code. In one embodiment, each transaction message stored in the first database may include a message type indicator indicative of an authorization request. In some embodiments, the one or more standards may include the ISO 8583 standard.

In step 504, a plurality of attribute correspondences (e.g., attribute correspondences 214) may be stored in a second database (e.g., the attribute database 212) of the processing server, wherein each attribute correspondence includes a correspondence between a transaction attribute and a data element value for a specific data element of the plurality of data elements. In step 506, a first query may be executed by a processor (e.g., the processing unit 204) of the processing server on the first database to identify a subset of transaction messages where the response code stored in the first data element is one of a predetermined set of response code values. In one embodiment, each response code value of the predetermined set of response code values may correspond to a technical decline of an associated payment transaction. In some embodiments, each transaction message included in the identified subset of transaction messages may include a message type indicator indicative of an authorization request.

In step 508, a second query may be executed on the identified subset of transaction messages by the processor of the processing server to associate, for each transaction message, one or more transaction attributes based on data element values for the plurality of data elements included in the respective transaction message and the plurality of attribute correspondences stored in the second database. In step 510, one or more transaction groups may be identified by the processor of the processing server, wherein each transaction group corresponds to at least one transaction attribute and includes one or more transaction messages of the identified subset of transaction messages associated with each corresponding transaction attribute.

In step 512, the identified one or more transaction groups may be transmitted by a transmitting device (e.g., the transmitting unit 206) of the processing server. In some embodiments, the identified one or more transaction groups may be transmitted to a display device configured to display the identified one or more transaction groups to an authorized user.

In one embodiment, each transaction message stored in the first database may include a second data element configured to store an acquirer identification code. In a further embodiment, the second data element included in each transaction message in the identified subset of transaction messages may store a common acquirer identification code. In another further embodiment, the method 500 may further include receiving, by a receiving device (e.g., the receiving unit 202) of the processing server, a transaction message request, wherein the transaction message request includes at least a specific acquirer identification code, wherein the second data element included in each transaction message in the identified subset of transaction messages stores the specific acquirer identification code. In an even further embodiment, the identified one or more transaction groups may be transmitted in response to the received transaction message request.

Computer System Architecture

Figure 6:
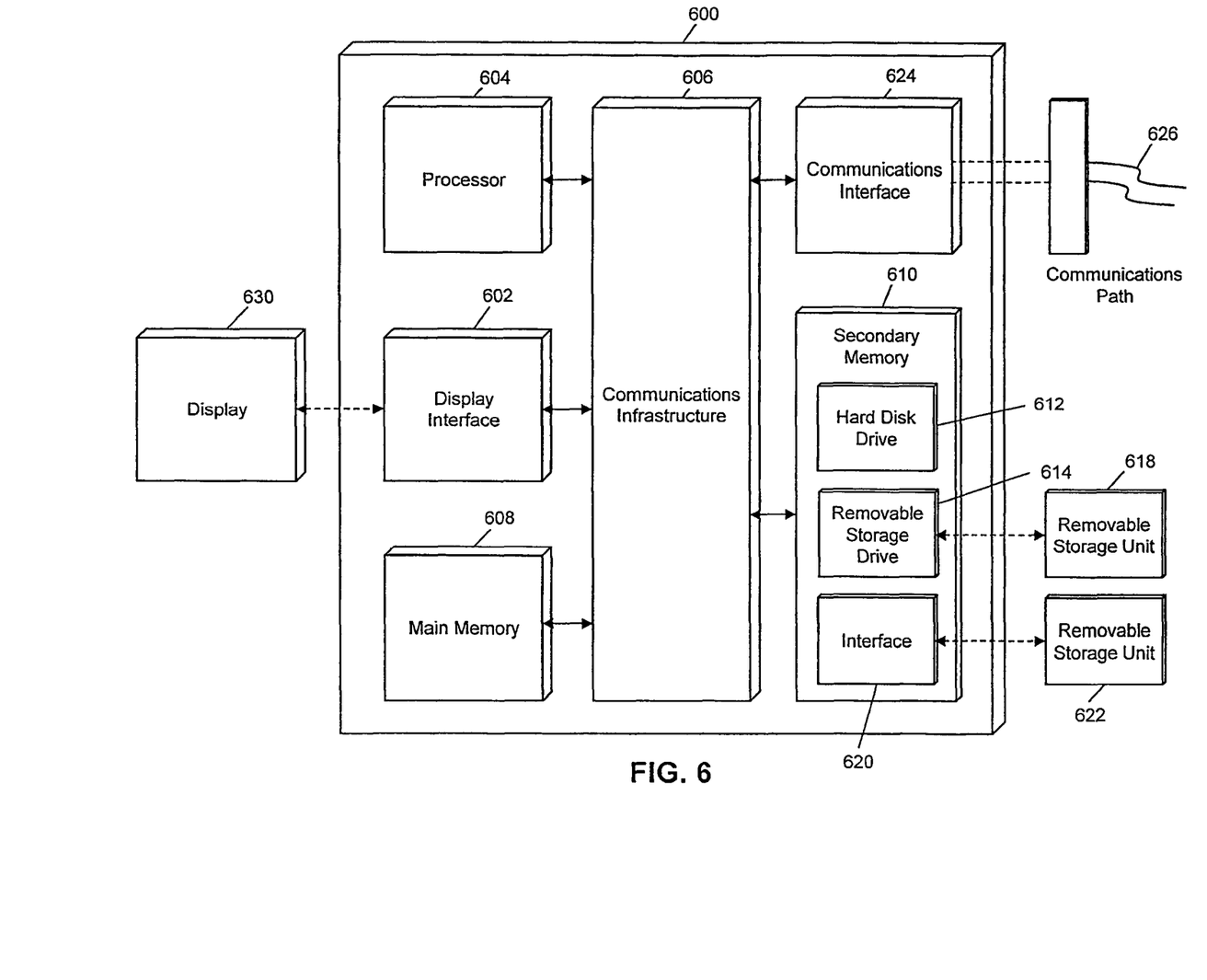
FIG. 6 is a block diagram illustrating a computer system architecture in accordance with exemplary embodiments.

FIG. 6 illustrates a computer system 600 in which embodiments of the present disclosure, or portions thereof, may be implemented as computer-readable code. For example, the processing server 102 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-5.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, mini-computers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 3-5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for assigning attributes to transaction messages and categorization thereof based on data values of data elements for transactions messages exhibiting technical decline factors. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for identifying attributes for transaction messages exhibiting technical decline factors, comprising:

storing, in a first database of a processing server, a plurality of transaction messages, wherein each transaction message is formatted based on one or more standards and includes a plurality of data elements including at least a first data element configured to store a response code and a second data element configured to store an acquirer identification code;

storing, in a second database of the processing server, a plurality of attribute correspondences, wherein each attribute correspondence includes a correspondence between a transaction attribute and a data element value for a specific data element of the plurality of data elements;

executing, by a processor of the processing server, a first query on the first database to identify a subset of transaction messages where the response code stored in the first data element is one of a predetermined set of response code values and the second data element included in each transaction message in the identified subset of transaction messages stores a specific acquirer identification code;

executing, by the processor of the processing server, a second query on the identified subset of transaction messages to identify, for each transaction message, one or more transaction attributes in the second database which correspond to data element values for the plurality of data elements included in the respective transaction message;

assigning, by the processor of the processing server, the identified one or more transaction attributes to the respective transaction message;

identifying, by the processor of the processing server, one or more transaction groups, wherein each transaction group corresponds to at least one transaction attribute and includes one or more transaction messages of the identified subset of transaction messages having the assigned one or more transaction attributes; and transmitting to a computing device associated with the specific acquirer identification code, by a transmitting device of the processing server, the identified one or more transaction groups to improve data quality of future transaction messages based on at least the response code and assigned attributes of the one or more transaction groups.

2. The method of claim 1, further comprising:
receiving, by a receiving device of the processing server, a transaction message request, wherein the transaction message request includes at least the specific acquirer identification code.

3. The method of claim 2, wherein the identified one or more transaction groups are transmitted in response to the received transaction message request.

4. The method of claim 1, wherein each response code value of the predetermined set of response code values corresponds to a technical decline of an associated payment transaction and the technical decline identifies a compromise in data quality or data processing.

5. The method of claim 1, wherein each transaction message stored in the first database includes a message type indicator indicative of an authorization request.

6. The method of claim 1, wherein each transaction message included in the identified subset of transaction messages includes a message type indicator indicative of an authorization request.

7. The method of claim 1, wherein the one or more standards includes the ISO 8583 standard.

8. The method of claim 1, wherein the identified one or more transaction groups are transmitted to a display device configured to display the identified one or more transaction groups to an authorized user.

9. The method of claim 1, wherein the at least one transaction attribute identifies a transaction data processing requirement for completing a transaction of an issuer.

10. A system for identifying attributes for transaction messages exhibiting technical decline factors, comprising:
a first database of a processing server configured to store a plurality of transaction messages, wherein each transaction message is formatted based on one or more standards and includes a plurality of data elements including at least a first data element configured to store a response code and a second data element configured to store an acquirer identification code;
a second database of the processing server configured to store a plurality of attribute correspondences, wherein each attribute correspondence includes a correspondence between a transaction attribute and a data element value for a specific data element of the plurality of data elements;
a processor of the processing server configured to
execute a first query on the first database to identify a subset of transaction messages where the response code stored in the first data element is one of a predetermined set of response code values and the second data element stores the specific acquirer identification code,
execute a second query on the identified subset of transaction messages to identify, for each transaction message, one or more transaction attributes in the second database which correspond to data element values for the plurality of data elements included in the respective transaction message,
assign the identified one or more transaction attributes to the respective transaction message, and
identify one or more transaction groups, wherein each transaction group corresponds to at least one transaction attribute and includes one or more transaction messages of the identified subset of transaction messages having the assigned one or more transaction attributes; and
a transmitting device of the processing server configured to transmit the identified one or more transaction groups to a computing device associated with the specific acquirer identification code for improving data quality of future transaction messages based on at least the response code and assigned attributes of the one or more transaction groups.

11. The system of claim 10, further comprising:
a receiving device of the processing server configured to receive a transaction message request, wherein the transaction message request includes at least a specific acquirer identification code.

12. The system of claim 11, wherein the identified one or more transaction groups are transmitted in response to the received transaction message request.

13. The system of claim 10, wherein each response code value of the predetermined set of response code values corresponds to a technical decline of an associated payment transaction and the technical decline identifies a compromise in data quality or data processing.

14. The system of claim 10, wherein each transaction message stored in the first database includes a message type indicator indicative of an authorization request.

15. The system of claim 10, wherein each transaction message included in the identified subset of transaction messages includes a message type indicator indicative of an authorization request.

16. The system of claim 10, wherein the one or more standards includes the ISO 8583 standard.

17. The system of claim 10, wherein the identified one or more transaction groups are transmitted to a display device configured to display the identified one or more transaction groups to an authorized user.

18. The system of claim 10, wherein the at least one transaction attribute identifies a transaction data processing requirement for completing a transaction with an issuer.

* * * * *